INVENTOR.
Leonard R. Kahn
BY
Mathis & Graybeal
ATTORNEYS

United States Patent Office 3,275,940 Patented Sept. 27, 1966

3,275,940

AUTOMATIC FREQUENCY CONTROL MEANS FOR SINGLE-SIDEBAND RECEIVERS AND THE LIKE

Leonard R. Kahn, 81 S. Bergen Place, Freeport, N.Y.

Filed May 28, 1963, Ser. No. 283,740
8 Claims. (Cl. 325—423)

The present invention relates to improvements in automatic frequency control systems and more particularly to frequency difference detection and correction signal storage circuits in radiant energy equipments of the type involving a comparison of a carrier component frequency with a stable reference frequency, with the carrier component frequency being regulated in response to a correction signal, and with a correction condition being maintained for a substantial period under conditions of carrier fading.

As will be understood by those skilled in the art to which the invention is addressed, such automatic frequency control and correction signal storage circuits and techniques have utility in a variety of radiant energy equipments requiring precise frequency stability for proper operation, such as single-sideband receivers, exalted carrier receivers, frequency modulation monitors, deviation indicators, and the like.

In several respects the present invention is an improvement over the automatic frequency control system and correction signal storage circuitry disclosed in my prior U.S. Patent No. 2,976,411, entitled, Automatic Frequency Control System Suitable for Single Sideband Receivers, Frequency Modulation Transmitters and the Like, granted March 21, 1961, to which reference is to be made for a fuller understanding of certain of the principles underlying the present invention, particularly as to the general proposition of generating and comparing positive and negative pulses to realize a correction signal for automatic frequency control. However, as will become apparent from the following discussion, the automatic frequency control and signal storage techniques characterizing the present invention offer several significant advantages over the circuits and techniques disclosed in said patent.

In the automatic frequency control system disclosed in my prior Patent 2,976,411, an incoming carrier (or carrier component) frequency and a stable reference frequency are mixed and limited, and the frequency difference therebetween is developed by use of a frequency discriminator (as at 209 in FIG. 1 and at 244 in FIG. 2 of the description of said patent) to develop the characteristic low frequency pulse wave (as at FIGS. 8 and 9 of said patent) from which the correction signal is derived for automatic frequency control.

Commercial practice has shown that such phase generation by use of a frequency discriminator suffers several inherent disadvantages. Pulse development by use of a discriminator requires rather critical tuning of the discriminator. Further, the circuit is quite sensitive to change in component values, since change in component values affects tuning, at least in most instances. Further, and perhaps most importantly, use of a frequency discriminator for pulse generation involves a critical relationship as to the relative amplitudes of the incoming carrier or carrier component frequency (which of course will vary depending on the degree of carrier fade) and the reference frequency. The optimum operating condition when using a frequency discriminator is to maintain the incoming carrier and reference frequency amplitudes close to equality in order that sharp changes in phase (i.e. phase whip) occur, such as illustrated in FIGS. 4 and 6 of said patent. As will be apparent, if the reference frequency and incoming carrier amplitudes are exactly equal, the phase relationship theoretically becomes discontinuous. As the amplitudes of the reference frequency and incoming carrier or carrier component frequency depart from equality, the phase slope becomes less abrupt, approaching a substantially sinusoidal variation. It is thus important, in use of a frequency discriminator, to operate with the reference frequency and incoming carrier component frequency close to the same amplitude. However, if the reference frequency suddenly becomes relatively larger in amplitude than the incoming carrier component frequency, such as on the occasion of a reduction in incoming carrier amplitude (i.e. carrier fade), the phase rotation reverses so that the phase relationship which properly should be as shown at FIG. 4 in said patent becomes the phase relationship shown at FIG. 6 thereof, and the pulses shown respectively at FIGS. 5 and 7 of said patent become reversed so that the direction of frequency correction is reversed. With the frequency correction reversed, instead of a compensating or counteracting frequency correction the frequency error is multiplied and the automatic frequency control destroyed.

It is a further disadvantage of the automatic frequency control system disclosed by my prior Patent No. 2,976,411 that the correction signal storage circuitry thereof is quite complex. While its corection signal storage technique offers the advantage of maintaining a given correction signal substantialy indefinitely under a condition of carrier fade, it has been determined that a much simpler correction signal storage means can suffice under most operating conditions, from a practical point of view, and that the correction signal storage means can be a simple RC type storage network provided the network is designed and operated so as to deliver a stored correction signal over a more prolonged period than heretofore possible with conventional RC type signal storage circuits.

Accordingly the principal objects, features, advantages and characteristics of the present invention include; the provision of an automatic frequency control circuit wherein frequency error related pulses are derived through non-tuned circuitry, specifically a phase detector means; the provision in an automatic frequency control circuit employing pulse detection of a circut which is non-critical as to change in component values; the provision in an automatic frequency control circuit of means generating a proper correction signal regardless of the relative amplitudes of the carrier component frequency and the reference frequency, or regardless of operational variations as to these respective amplitudes; the provision in an automatic frequency control system of a simple correction signal storage circuit wherein essentially passive, RC type storage circuits are employed without necessity of use of more complex correction signal storage means; and, more specifically, the provision of an RC type signal storage system characterized by the maintenance of a dynamic correction signal and also the maintenance of a stored correction signal which is proportional to and at a somewhat higher value than the dynamic correction signal and which has a decay circuit with a time constant substantially greater than that of the dynamic correction signal storage means.

These and other objects, features, advantages and characteristics of the present invention will be apparent from the following description of a typical embodiment of the invention, taken together with the accompanying drawings, wherein.

Figures 1, 2:
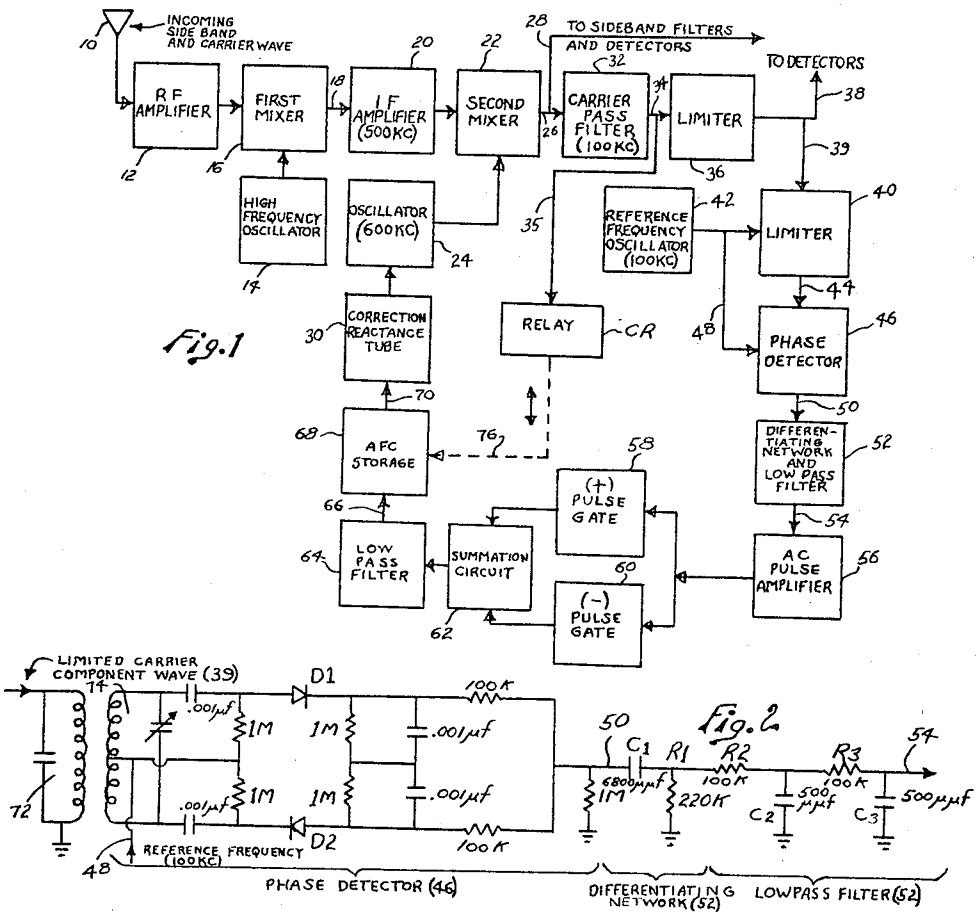
FIG. 1 is a block diagram of a single-sideband receiver employing frequency error related pulse generation circuitry and correction signal storage circuitry typical of the present invention.
FIG. 2 is a schematic circuit showing the component makeup of the phase detector, differentiating network and low-pass filter portions of the receiver portrayed in FIG. 1.

FIG. 1 is a block diagram presentation of a single-sideband type receiver employing frequency error related pulse generation by means of a phase detector and a differentiating circuit, and further employing an RC type correction voltage storage circuit according to the present invention. In general layout, except for the specific portions of the receiver indicated, the single-sideband receiver shown at FIG. 1 is essentially similar to the single-sideband type receiver illustrated in FIG. 2 of my said prior Patent 2,976,411.

In FIG. 1, the incoming single-sideband and carrier wave is picked up by antenna 10, amplified in RF amplifier 12, then heterodyned with the output of a high frequency oscillator 14 in a first mixer stage 16 to obtain the desired IF frequency (500 kc. being selected by way of example). The IF signal 18 is fed to IF amplifier 20 and thence to a second mixer stage 22. Also fed to second mixer stage 22 is the output from a local oscillator 24 operating at a frequency (such as 600 kc. in the example selected) to provide an output 26 from the second mixer stage 22 which is, in a typical case, 100 kc. plus or minus the sideband frequencies, which output 26 is passed to conventional sideband filters and detectors, as indicated at 28. As will be understood, a portion of the output 26 is what may be termed a carrier component frequency (in that it is representative of the incoming carrier frequency) and for proper receiver operation this carrier component frequency is to be maintained at precisely 100 kc. by the automatic frequency control system.

To develop the desired correction signal for appropriate control of the correction reaction tube 30, a portion of the output 26 from the second mixer stage 22 is fed to a carrier pass filter 32 and the isolated carrier component wave 34 from the filter 32 is passed to a limiter 36 and thence to detectors in a manner conventional per se, as indicated at 38, a further portion 39 of the isolated carrier component wave also being fed to a further limiter stage 40. Carrier pass filter 36 has a quite narrow passband and in typical designs this passband is ±10–50 cycles, the precise passband selected being determined by design specifications as to tolerable noise level and tolerable frequency deviation.

Figure 4:
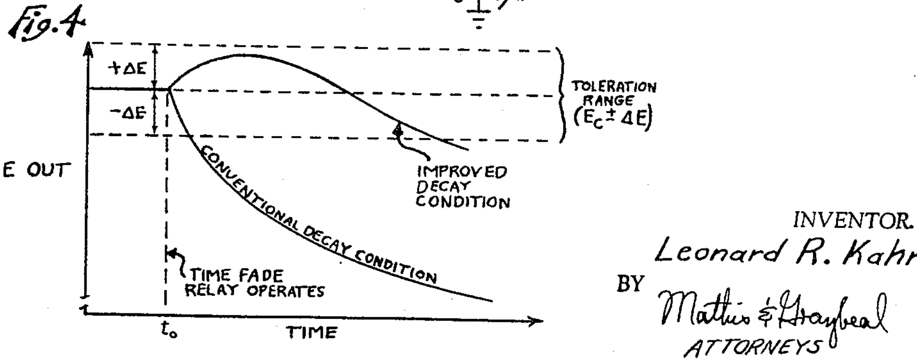
FIG. 4 is a generalized graphical presentation showing the stored correction signal decay pattern characteristic of the circuit shown at FIG. 3, as compared with the decay pattern of a conventional RC type signal storage circuit.

A stable reference frequency from reference frequency oscillator 42 (operated at 100 kc., again by way of example) is mixed with the amplitude limited carrier component wave input 39 in limiter 40 and the output 44 from said limiter 40 is fed to a phase detector 46 along with a further reference frequency input 48 from reference frequency oscillator 42. Output 50 from phase detector 46 is essentially a triangular or sawtooth wave (such as shown at FIG. 4. in Patent No. 2,976,411) with some superimposed 100 kc. energy. This output 50 is in turn passed to a differentiating network and low-pass filter circuit 52. The output 54 from the circuit 52 is a series of low frequency pulses or pips, the predominant polarity of which is determined by whether the frequency of the isolated carrier component wave (at input 39) is above or below the reference frequency (phase detector input 48). These frequency error related pulses or pips in the output 54 are then applied to an A.C. pulse amplifier 56, then passed through respective positive and negative pulse gates 58, 60, then through summation circuit 62 and low-pass filter 64. The output 66 from low-pass filter 64, also termable the error voltage, can then be applied directly as the correction voltage for the reactance tube 30 or, as shown at FIG. 1, can be used as what may be termed the charging source or driving voltage for a correction signal storage circuit 68, the correction signal output 70 from the signal storage circuit 68 there serving as the correction voltage applied to the reactance tube 30. Variation in frequency of the oscillator 24, by variation in reactance of the reactance tube 30, is accomplished in a manner conventional per se (compare correction reactance tube 254 and oscillator 255 in FIG. 2 of my aforesaid Patent 2,976,411, for example).

FIG. 2 presents a schematic showing of a typical circuit for use at 100 kc. to perform the functions of phase detector 46, and the differentiating network and low-pass filter 52. The limited carrier component wave (input 39) is applied to the input circuit 72 of the phase detector 46, and the reference frequency input 48 is applied to the tuned secondary circuit 74, with phase detection occurring by means of diodes D1 and D2, the phase detector output 50 being an essentially triangular wave. The component values shown in FIG. 2 are suitable for operation at 100 kc., as earlier indicated. As will be noted, with respect to the phase detector circuit shown, a reversal of phase is impossible because the polarizing reference phasor is also the reference frequency and, while the sharpness of the pulses or pips obtained upon differentiation of the output signal can vary somewhat, the polarity of the pulses or pips can never reverse. As will also be apparent, the phase detector does not require any critical tuning and therefore is insensitive to aging or drift in the values of the circuit components. As compared with a a frequency discriminator, the phase detector circuit is much less susceptible to incorrect alignment by maintenance personnel.

As will be apparent, the phase detector circuit presented at FIG. 2 is of a type conventional per se, and any suitable type of phase detector can be employed in practice of the invention, consistent with the manner of operation indicated. Several appropriate forms of phase detector circuits suitable for the purpose are disclosed at pages 272–5 of the Terman and Pettit text entitled, "Electronic Measurements" (2nd edition), published by McGraw-Hill Publishing Company, for example.

In FIG. 2, the resistance-capacitance (RC) circuit comprising condenser C1 and resistance R1 functions as the differentiating network, generating pulses or pips from the phase detector output wave 50. The circuit comprised of resistor R2, condenser C2, resistor R3 and condenser C3 serves as a low-pass filter between the differentiating network C1, R1 and the A.C. pulse amplifier 56. This low-pass filter circuit functions to remove the 100 kc. energy from the phase detector output 50, and does so without substantial alteration of the pulses formed by the differentiating network R1, C1. If this low-pass filter circuit did not have correct component values, the pulses or pips appearing in the output from the differentiating circuit would be integrated and the desired action of the circuit lost, but the typical component values indicated in FIG. 2 are small enough so that the low-pass filter circuit does not materially disturb the low frequency pulses or pips in the output 54.

In FIG. 1, the correction voltage obtained as output 66 from low-pass filter 64 is essentially direct current (D.C.) in character, varying in value proportionately with variation in the frequency error to be corrected.

As earlier indicated, the single-sideband receiver shown in block diagram in FIG. 1 incorporates a special RC type correction signal storage circuit 68. Correction signal storage circuits of the RC type are widely used in AFC systems for single-sideband receivers and the like to maintain proper tuning during carrier fades of short duration. However, as conventionally employed, these storage circuits are merely composed of a large capacitance charged through a relay controlled circuit which is in turn fed by a low impedance charging source, the voltage appearing across the capacitance being used to control the action of the correction reactance tube. When the carrier level decreases, i.e. in a fade condition, the relay is caused to operate and disconnect the charging source from the capacitance, the capacitance thereupon being isolated except for its connection to the correction reactance tube. The difficulty in conventional practice is that grid leakage in the reactance tube inherently leads to a lower than optimum discharge impedance so the conventional RC storage circuit tends to decay, i.e. discharge, to a low voltage in a relatively rapid manner, causing unacceptable change in reactance tube grid voltage in a relatively short period. In the special RC type circuit employed in the present invention, and as typically schematically shown in FIG. 3, the period during which the control grid of the reactance tube is maintained tolerably close to desired correction control voltage is greatly increased. The extent of increase of the period of acceptable control, i.e. the extent of time over which a given stored control voltage operates to maintain the control grid of the reactance tube within an assigned toleration range is graphically portrayed at FIG. 4 and more fully discussed below.

Figure 3:
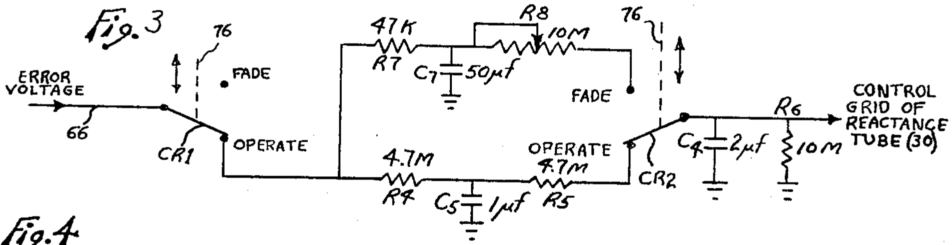
FIG. 3 is a schematic of the component make up of the correction signal storage portion of the receiver shown in FIG. 1.

In the correction signal storage circuitry shown at FIG. 3, during a period of normal operation (i.e. when the level of the incoming carrier component frequency is adequate to dynamically compare with the reference frequency), it is desired to control the reactance tube 30 from a relatively low impedance source. To this end, the control grid of the reactance tube 30 receives its control voltage from the circuit path shown along the bottom of FIG. 3, i.e. the driving voltage input 66 is applied to a voltage divider network made up of resistances R4, R5 and R6, the applied control voltage appearing dynamically across a capacitance C4. The driving voltage also charges a capacitance C5 in the voltage divider network. Because of the component values involved, as shown in FIG. 3, the control voltage appearing across capacitance C4 and resistance R6 as applied to the control grid of the reactance tube 30 under the normal operating condition is substantially less than (and in the example selected approximately one-half) the driving voltage 66 applied to the storage network. The reason for this attenuation will appear shortly. The driving voltage applied to the storage network, i.e. input 66, is also applied to a relatively large capacitance C7 through a relatively small charging resistance R7. In the normal operating condition, capacitance C7 has no D.C. return path, i.e. voltage divider circuit and capacitance C7 charges to the full value of the driving voltage.

When a fade occurs in the carrier component frequency level, a carrier level responsive relay CR (FIG. 1) is actuated by an input 35 derived from and proportional to the signal level of carrier component wave 34, and the relay contacts CR1 and CR2 (FIG. 3) are moved from their normal "OPERATE" position shown to their "FADE" position, the relay actuation of the contacts CR1 and CR2 being designated at 76 in FIGS. 1 and 3. Control of relay CR responsive to the level of the carrier component frequency wave 34 is effected in a manner conventional per se, as by diode detection and D.C. amplification of the detected wave level, with relay CR being selectively energized by the amplified signal.

Movement of relay contacts CR1 and CR2 to "FADE" position disconnects the driving voltage input 66 from R4 and R7, and connects C4 in the input circuit of correction reactance tube 30 with capacitance C7. Since capacitance C7 had been maintained with a relatively high charge, as compared with the charge on capacitance C4, the control voltage appearing at the control grid of reactance tube 30 immediately after relay CR is actuated will be somewhat greater than applied thereto solely by C4 across R6 in the voltage divider network R4, R5, R6. Resistance R8 in the discharge path of C7 is preferably variable so that the discharge time constant of the stored signal circuit can be selectively varied.

As will be apparent, in a fade condition, the voltage across capacitance C7 is the source of stored correction voltage applied to the control grid of the reactance tube 30. Since this stored correction voltage is greater than the dynamic correction voltage normally appearing at capacitance C4, the capacitance C7 for a time acts as a battery and very substantially prolongs the charge on capacitance C4 and thus greatly increases the effective period during which permissible frequency control is maintained during a fade. By suitable adjustment of the variable resistance R8, the extent of the increase of voltage across C4 can be made to be not so great as to bring the value of the control voltage out of the permissible range. As will be seen in the graphical presentation of FIG. 4, a slight increase in value of the voltage on the control grid of the reactance tube 30 can be tolerated (i.e. the voltage $E_C$ on the control grid can be increased an amount somewhat less than $\Delta E$ where the toleration range is $E_C$ plus or minus $\Delta E$).

Thus, as shown at FIG. 4, the "improved decay condition" (so designated) is characterized by an initial increase in control voltage, induced by the more highly charged capacitance C7, with a markedly longer control time being realized before the control voltage decays out of the toleration range than would be the case if capacitance C4 were merely disconnected from the driving voltage and simply allowed to decay exponentially (such latter condition being designated the "conventional decay condition" for comparison purposes).

From the foregoing, further modifications, adaptations and variations of the principles and techniques of the present invention and of circuit arrangements incorporating same, will be apparent to those skilled in the art to which the invention is addressed, within the scope of the following claims.

What is claimed is:

1. In an electronic system requiring automatic frequency stabilization, means generating and mixing a carrier component frequency and a stable reference frequency, phase detection means deriving from the mixed frequencies a signal representative of the phase difference between said carrier component frequency and said reference frequency, means differentiating the output from said phase detection means and generating a signal characterized by positive and negative pulses, low-pass filter means deriving from said pulses a correction signal, and correction reaction means responsive to said correction signal and regulating the frequency of said carrier component frequency to minimize any frequency difference between said carrier component frequency and said reference frequency.

2. In an electronic system requiring frequency stabilization and having a local oscillator generating a carrier component frequency, means selecting and isolating a sample of said carrier component frequency, means generating a stable reference frequency, means mixing said carrier component frequency and said reference frequency, means amplitude limiting the output from said mixing means, phase detection means deriving from the amplitude limited output of said mixing means a signal representative of the phase difference between said carrier component frequency and said reference frequency, means differentiating the output from said phase detection means and generating a signal characterized by positive and negative pulses, summation means comparing said positive and negative pulses, low-pass filter means deriving from the output of said summation means a correction signal, and correction reactance means responsive to said correction signal and regulating the frequency of said local oscillator to minimize any frequency difference between said carrier component frequency and said reference frequency.

3. In an electronic system requiring frequency stabilization and having a local oscillator generating a carrier component frequency, means selecting and isolating a sample of said carrier component frequency, means generating a stable reference frequency, means mixing said carrier component frequency and said reference frequency, means amplitude limiting the output from said mixing means, phase detection means deriving from the amplitude limited output of said mixing means a signal representative of the phase difference between said carrier component frequency and said reference frequency, means differentiating the output from said phase detection means and generating a signal characterized by positive and negative pulses, summation means comparing said positive and negative pulses, low-pass filter means deriving from the output of said summation means a dynamic correction signal, correction signal storage means operable to maintain a stored correction signal, correction reactance means responsive to either said dynamic correction signal or said stored correction signal to regulate the frequency of said local oscillator in a manner minimizing any frequency difference between said carrier component frequency and said reference frequency, and switch means operated in response to the carrier component wave level to apply said dynamic correction signal to said correction reactance means when the incoming carrier is above a predetermined level and to apply said stored correction signal to said correction reactance means when said incoming carrier is below said predetermined level.

4. An electronic system according to claim 3, wherein said correction signal storage means generates a stored correction voltage of a value slightly greater than the value of the input to said correction reactance means when the incoming carrier is above said predetermined level.

5. An electronic system according to claim 4, wherein said correction signal storage means comprises an RC type voltage divider network including first capacitance means across which said dynamic correction signal appears, and said correction signal storage means further comprises a second RC circuit including a second capacitance means across which said stored correction signal appears.

6. In radiant energy receiving equipment subject to occasional fading of the received signal and having a local oscillator establishing a predetermined IF frequency for the equipment, automatic frequency control means comprising means selecting and isolating a sample of a signal carrier component frequency, means generating a stable reference frequency, means comparing said carrier component frequency and said reference frequency and developing a correction signal related to the frequency difference between said carrier component frequency and said stable reference frequency, correction signal storage means to which said correction signal is fed during periods when the incoming carrier level is greater than a predetermined value and from which a stored correction signal is available to maintain said IF frequency substantially constant for a substantial period when the incoming carrier level is less than said predetermined value, and reaction oscillator means responsive to said correction signal for varying said local oscillator in a manner maintaining said IF frequency substantially constant, said correction signal storage means comprising a voltage divider network including a first capacitance charged by said correction signal to a value somewhat less than the voltage of the correction signal, said signal storage circuit further comprising a second capacitance charged by said correction voltage to substantially the full value of said correction voltage, said storage circuit further comprising switch means operated in response to the incoming carrier level to apply the voltage across said first capacitance to said correction reactance means when said incoming carrier level is above a predetermined value, and operable to apply the voltage across said second capacitance to said correction reactance means during a period when said incoming carrier level is less than a predetermined value.

7. The radiant energy receiving equipment according to claim 6, wherein said second capacitance is charged to a value about twice the value to which said first capacitance is charged.

8. The radiant energy receiving equipment according to claim 7, comprising a discharge circuit for said second capacitance when the latter is connected to said correction reaction means, with a selectively variable time constant.

No references cited.

KATHLEEN H. CLAFFY, *Primary Examiner.*

R. LINN, *Assistant Examiner.*